(12) United States Patent
Williams

(10) Patent No.: US 6,563,762 B1
(45) Date of Patent: May 13, 2003

(54) TERMINATION ASSEMBLY FOR DISPOSAL BETWEEN A MARINE TOW CABLE AND AN ACOUSTIC RECEIVER ARRAY

(75) Inventor: Michael R. Williams, Ledyard, CT (US)

(73) Assignee: The United States of America as represented by the Secretary of the Navy, Washington DC ( * ) Notice: Subject to any disclaimer, the term of this patent is extended or adjusted under 35 U.S.C. 154(b) by 2279 days.

(21) Appl. No.: 08/599,390

(22) Filed: Dec. 8, 1995

(51) Int. Cl.[7] .................................................. G01V 1/38
(52) U.S. Cl. ...................... 367/106; 367/130; 174/47; 174/101.5
(58) Field of Search ........................... 367/15, 20, 106, 367/130; 174/19, 47, 101.5, 74 R

(56) References Cited

U.S. PATENT DOCUMENTS

| | | | | |
|---|---|---|---|---|
| 4,180,103 A | * | 12/1979 | Mollere | 367/106 |
| 4,525,813 A | * | 7/1985 | Burrage | 367/20 |
| 5,183,966 A | * | 2/1993 | Hurtado et al. | 367/130 |
| 5,506,818 A | * | 4/1996 | Johnston | 367/144 |

* cited by examiner

Primary Examiner—Ian J. Lobo
(74) Attorney, Agent, or Firm—James M. Kasischke; Michael F. Oglo; Jean-Paul A. Nasser

(57) ABSTRACT

A termination assembly for disposal between a marine tow cable and an acoustic receiver array includes a cable sleeve having a grip portion adapted to grip a cable outer jacket, and a collar portion for disposition on a strength member portion of the cable. The termination assembly further includes a coupling comprising an inner sleeve for mounting on a coax portion of the cable, an electrical connector for abutting a distal end of the coax portion, a coupling body interconnecting the inner sleeve and the electrical connector, the coupling body having a cylindrically-shaped wall disposed around the electrical connector to define therebetween an annular recess for receiving a connector of the acoustic receiver array, a coupling nut mounted on the coupling body and engageable with the acoustic receiver array connector to lock the acoustic receiver array connector onto the electrical connector, and an outer sleeve fixed to the coupling body. The termination assembly still further includes a stiffener rod interconnecting the outer sleeve and the cable sleeve.

6 Claims, 2 Drawing Sheets

TERMINATION ASSEMBLY FOR DISPOSAL BETWEEN A MARINE TOW CABLE AND AN ACOUSTIC RECEIVER ARRAY

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to termination assemblies for mechanically and electrically interconnecting marine tow cables and acoustic receiver arrays, and is directed more particularly to such an assembly as is adapted for use with cables having synthetic fiber strength members and light-weight outer jacket materials.

(2) Description of the Prior Art

It is known to provide an interconnecting module (FIG. 1) between an array of acoustic receivers, such as hydrophones for receiving reflected sonar signals, and a tow cable by which the array is towed from a vessel, such as a submarine. The tow cable provides the mechanical structure by which the array is towed by the vessel, and provides a housing for an electrical cable by which the acoustic energy received by the acoustic receivers is transmitted to the vessel. Thus, the interconnecting module, referred to as a "termination" connects the array to the tow cable mechanically and also provides for electrically bridging the distance between the tow cable and the array.

Tow cables of the marine type commonly used in the prior art for towing of arrays of acoustic receivers include, among a host of components, a "strength member" for bearing the major portion of the mechanical load and an outer jacket for water-proofing the cable. In the prior art, the strength member was typically a plurality of layers of steel and the outer jacket a layer of urethane. The termination was bonded to the cable outer jacket, as by adhesive bonding.

In an effort to reduce the bulk and weight of such tow cables, and to increase flexibility, the cable shown in FIG. 2 has been developed for service. The "strength member" of the cable illustrated in FIG. 2 comprises layers of material having high tensile strength, such as aromatic polyamide fibers available under the tradename "Kevlar", or the like, and the outer jacket comprises a layer of durable, light-weight plastic such as a ionomer resin available under the tradename "Surlyn", or the like, both materials substantially lighter in weight than the materials heretofore used.

Accordingly, there is a need for a termination which mechanically interconnects a tow cable having a durable, light-weight plastic jacket, and an array. There is further a need for a termination which provides additional strength in the areas of (1) the end of the cable outer layers, (2) the end of the strength member, wherein the strength member extends free of the tow cable outer layers, and (3) in the area of the end of the coax cable, wherein are housed the electrical transmission lines, and wherein the coax extends free of the strength member. To facilitate handling of the cable, termination, and array, it is required that the diameter of the termination be no greater than the diameter of the tow cable.

SUMMARY OF THE INVENTION

Accordingly, an object of the invention is to provide a termination assembly which provides a mechanical and electrical interface between a marine tow cable and an acoustic receiver array.

A further object of the invention is to provide such an assembly connectable to a tow cable having an outer jacket of durable, light-weight plastic which is not easily "bonded" to and has to be positively attached to, the strength member termination area.

A still further object of the invention is to provide such an assembly wherein the diameter of the assembly does not exceed the diameter of the cable.

With the above and other objects in view, as will hereinafter appear, a feature of the present invention is the provision of a termination assembly for disposal between a marine tow cable and an acoustic receiver array. The assembly comprises a cable sleeve having a grip portion adapted to grip a cable outer jacket and a collar portion for disposition on a strength member portion of the cable. The termination assembly further includes a coupling comprising an inner sleeve for mounting on a coax portion of the cable, an electrical connector for abutting a distal end of the coax portion, a coupling body interconnecting the inner sleeve and the electrical connector, the coupling body having a cylindrically-shaped wall disposed around the electrical connector to define therebetween an annular recess for receiving a connector of the acoustic receiver array, a coupling nut mounted on the coupling body and engageable with the acoustic receiver array connector to lock the acoustic receiver array connector onto the electrical connector, and an outer sleeve fixed to the coupling body. The termination assembly still further includes a stiffener rod interconnecting the outer sleeve and the cable sleeve.

In accordance with a further feature of the invention, the termination is provided with a maximum diameter no greater than the tow cable diameter.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
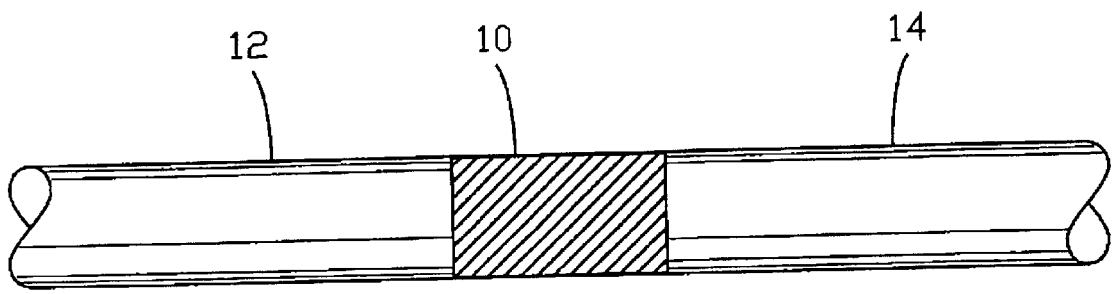
FIG. 1 is a diagrammatic illustration showing the placement of the termination assembly.

Referring to FIG. 1, it will be seen that the termination 10 described herein is adapted to interface between a towed array 12 and a tow cable 14 by which array 12 and termination 10 are pulled through a water environment by a marine vessel, such as a submarine (not shown).

Figure 2:
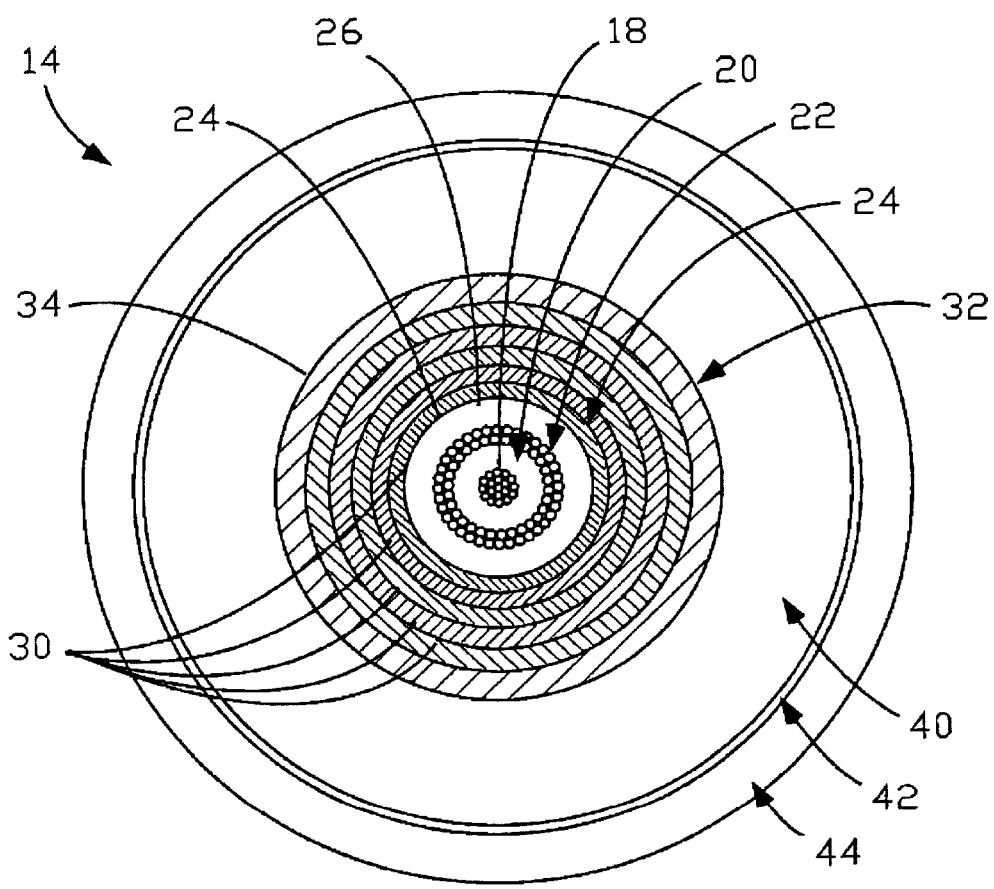
FIG. 2 is a sectional view of a tow cable of the type for which the termination assembly is provided.

Referring to FIG. 2, it will be seen that tow cable 14 with which the instant invention is used, comprises central electrical conductors 18 surrounded by a layer of dielectric material 20, such as polypropolene which, in turn, is surrounded by a metal wire braided layer 22. The wire braid layer 22 is covered with a coat 24 of PVC. The central portion of cable 14 described thus far constitutes a coax portion 26 of cable 14.

Around coax portion 26 of cable 14 are disposed a plurality of layers 30 of a material having high tensile strength and a high resistance to elongation. Layers 30 may be in aromatic polyamide fiber such as available under the tradename "Kevlar", or the like. A polyester tape (not shown), such as that available under the tradename "Mylar", or the like, is wound between each of the layers 30. The layers 30 are bounded by a thermoplastic jacket 32. The layers 30 and thermoplastic jacket 32 define a strength member portion 34 of cable 14.

Around strength member portion 34 of cable 14 is disposed a layer 40 of thermoplastic or polyethylene, around which there is disposed a cordage braid layer 42. Cordage braid layer 42 is preferably comprised of a polyester fiber material, such as polyethylene terephthalate, available under the trade name "Dacron", or the like. An outer jacket 44 of a flexible, light-weight, tough thermoplastic, such as is available under the trade name "Surlyn", or the like, is disposed around layer 42.

Figure 3:
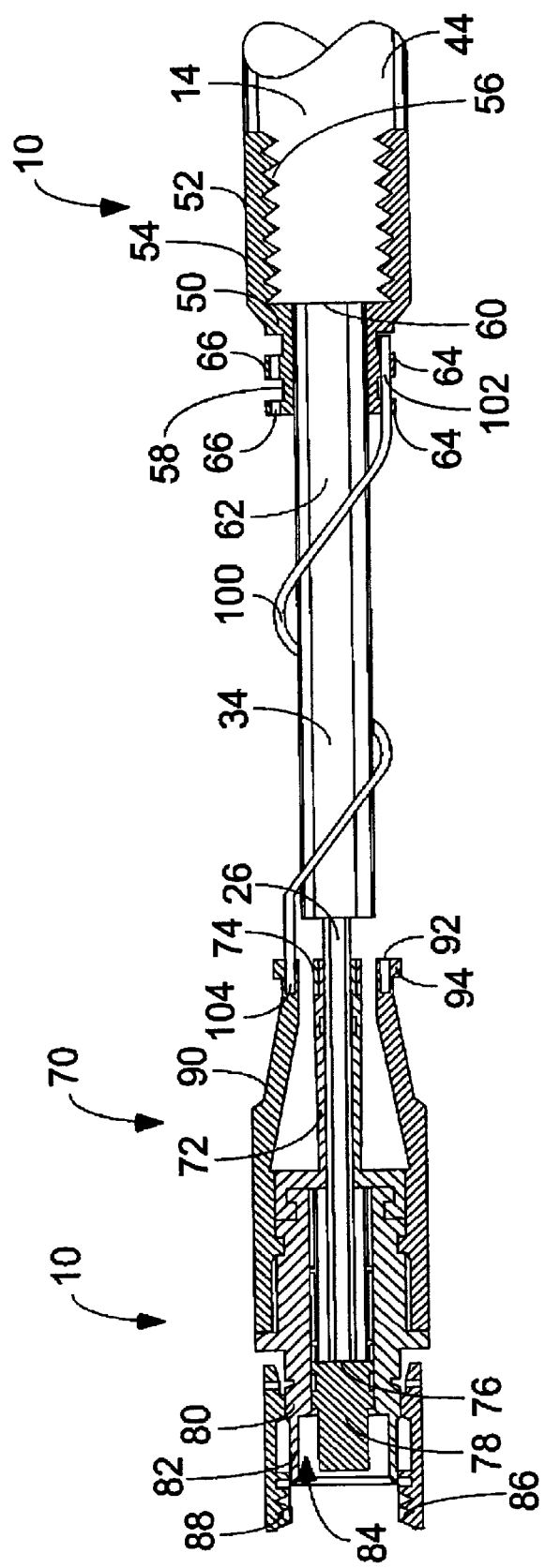
FIG. 3 is a partly side elevational and partly sectional view of one form of termination assembly illustrative of an embodiment of the invention.

Referring to FIG. 3, it will be seen that termination 10 includes a cable sleeve 50 having a grip portion 52 which comprises a cylindrically-shaped sleeve portion 54 having internal teeth 56 therein. The teeth 56 bite into cable 14 to extend through outer jacket 44, cordage braid layer 42, and well into thermoplastic layer 40, to securely connect sleeve 50 to cable 14. Cable sleeve 50 further includes a collar portion 58 which is disposed around a portion 62 of the strength member 34 which extends beyond an end 60 of the cable outermost layers 40,42,44. The collar portion 58 is provided with one or more flanges 64 having holes 66 extending therethrough. If a plurality of flanges 64 are provided, holes 66 of the flanges are aligned with holes of the other flange or flanges to provide at least one axial passageway through the flanges.

Termination 10 further includes a coupling 70 comprising an inner sleeve 72, preferably made of titanium, in two parts, and clamped upon coax portion 26 by a clamping ring 74, preferably made of titanium. Disposed within the coupling 70 and fixed to a distal end 76 of coax portion 26 is an electrical connector 78. A coupling body 80, preferably of titanium, interconnects inner sleeve 72 and electrical connector 78. The coupling body 80 is provided with a cylindrically-shaped wall 82 disposed around electrical connector 78 to define therebetween an annular recess 84 for receiving a connector (not shown) of the acoustic receiver array. A coupling nut 86, preferably of titanium, and having internal threads 88, is mounted on coupling body 80 and is threadedly engageable with the acoustic receiver array connector to lock the acoustic receiver array connector onto electrical connector 78. An outer sleeve 90 is fixed to coupling body 80.

The outer sleeve 90 is provided with at least one, and preferably a plurality of axial bores 92 extending from a proximal end 94 thereof.

Interconnecting coupling 70 and cable sleeve 50 is a number of stiffener rods 100 (one shown in drawings) corresponding to the number of bores 92, each of the stiffener rods 100 having a proximal end 102 fixed in holes 66 in flanges 64 of collar portion 58 of cable sleeve 50, and having a distal end 104 fixed in bore 92 in outer sleeve 90. Rods 100 are wound around exposed portion 62 of strength member 34. Rods 100 preferably are of cres wire of a diameter of about 0.059 inch. Cable sleeve 50 preferably is of stainless steel; outer sleeve 90 preferably is of titanium. Four rods 100 have been found suitable in that they provide the required added strength, and provide a balanced disposition of rods around the strength member 34.

Referring to FIG. 3, it will be seen that the diameter of cable sleeve 50 is no greater at any point than the diameter of tow cable 14. Both cable 14 and grip portion 52 of cable sleeve 50 are provided with diameters of about 1.175 inch. Outer sleeve 90 is provided with a diameter of about 1.170 inch. The stiffener rod 100 is confined within an area bounded by a hypothetical extension of the circumference of the cable sleeve grip portion 52. Accordingly, the termination described herein does not present a "bulge" and is therefore easier to handle and to roll onto winches, and the like.

There is thus provided a termination assembly which provides a mechanical and electrical interface between a tow cable and an acoustic receiver array, wherein the tow cable includes an outer jacket of durable, light-weight plastic which is not easily "bonded" to, and wherein the diameter of the assembly does not exceed the diameter of the cable.

It is to be understood that the present invention is by no means limited to the particular construction herein disclosed and/or shown in the drawings, but also comprises any modifications or equivalents within the scope of the claims.

What is claimed is:

1. A termination assembly for disposal between a marine tow cable and an acoustic receiver array, said assembly comprising:

a cable sleeve having a grip portion adapted to grip a cable outer jacket and a collar portion for disposition on a strength member portion of the cable;

a coupling comprising an inner sleeve for mounting on a coax portion of the cable, an electrical connector for abutting a distal end of the coax portion, a coupling body interconnecting said inner sleeve and said electrical connector, said coupling body having a cylindrically-shaped wall disposed around said electrical connector to define therebetween an annular recess for receiving a connector of the acoustic receiver array, a coupling nut mounted on said coupling body and engageable with the acoustic receiver array connector to lock the acoustic receiver array connector onto said electrical connector, and an outer sleeve fixed to said coupling body;

a stiffener rod interconnecting said outer sleeve and said cable sleeve;

wherein the largest diameter of said assembly is no greater than the diameter of the cable.

2. The assembly in accordance with claim 1 wherein said cable sleeve grip portion is provided with internal teeth for said gripping of the cable outer jacket.

3. The assembly in accordance with claim 2 wherein said cable sleeve collar portion includes a flange extending radially therefrom and having a bore therein, a proximal end of said stiffener rod being fixed in said bore.

4. The assembly in accordance with claim 3 wherein a distal end of said stiffener rod is fixed to said outer sleeve.

5. The assembly in accordance with claim 4 wherein said stiffener rod winds around the cable strength member.

6. The assembly in accordance with claim 1 wherein the diameter of each of said coupling nut, said outer sleeve, and said cable sleeve is no greater than the diameter of the cable.

* * * * *